Jan. 1, 1946. J. A. ANANIA 2,392,216
CUTTER TOOL ASSEMBLY
Filed Oct. 11, 1943 2 Sheets-Sheet 1
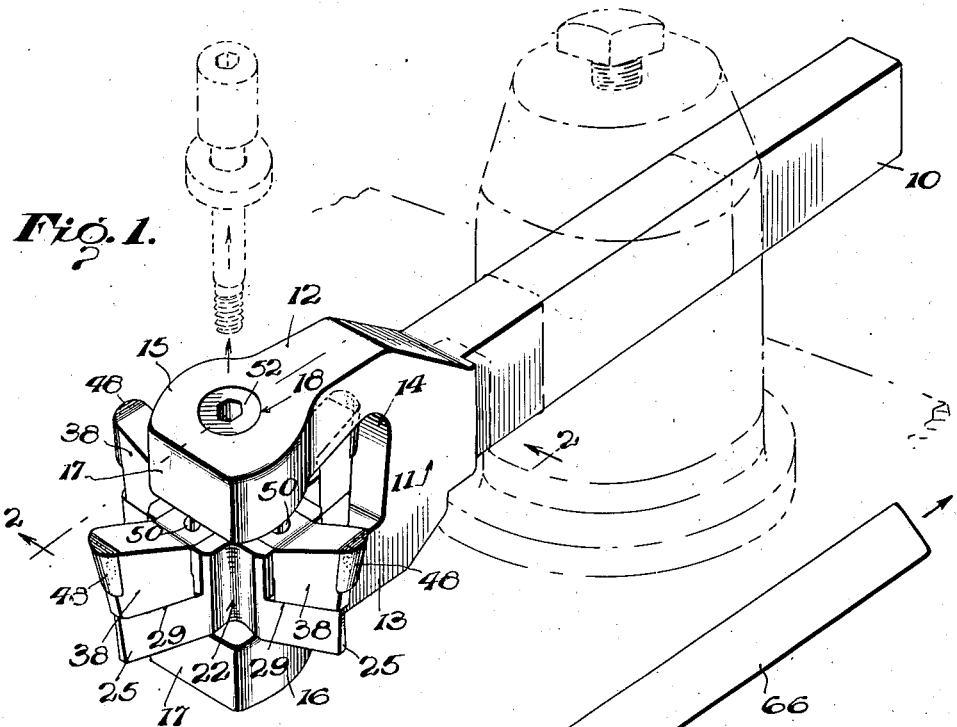
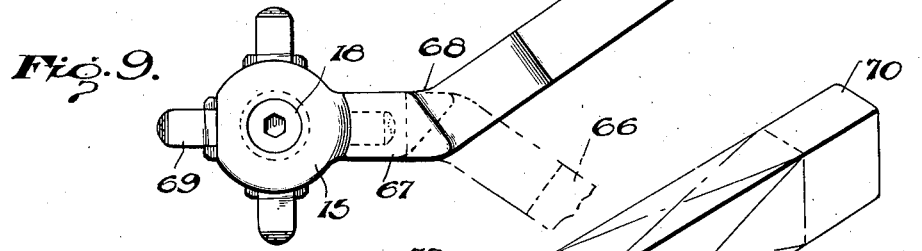
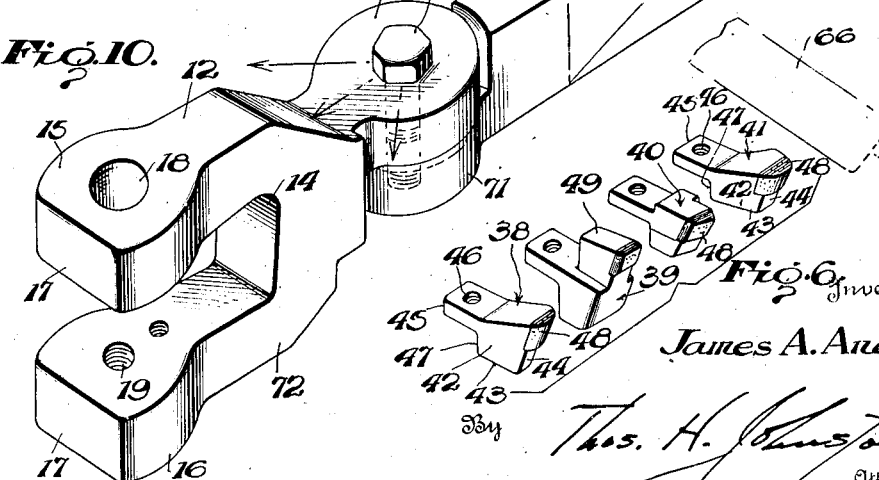
Inventor
James A. Anania.
By Thos. H. Johnston
Attorney

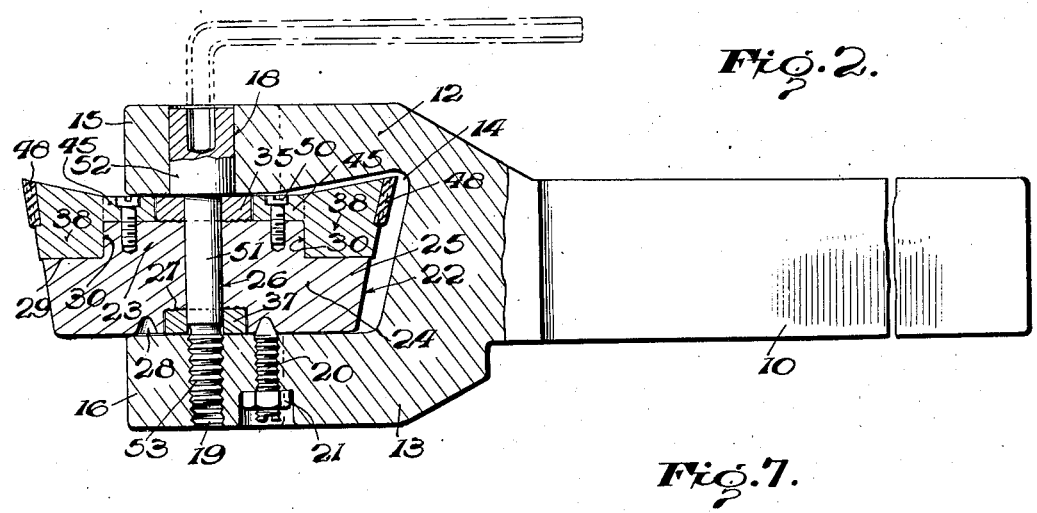
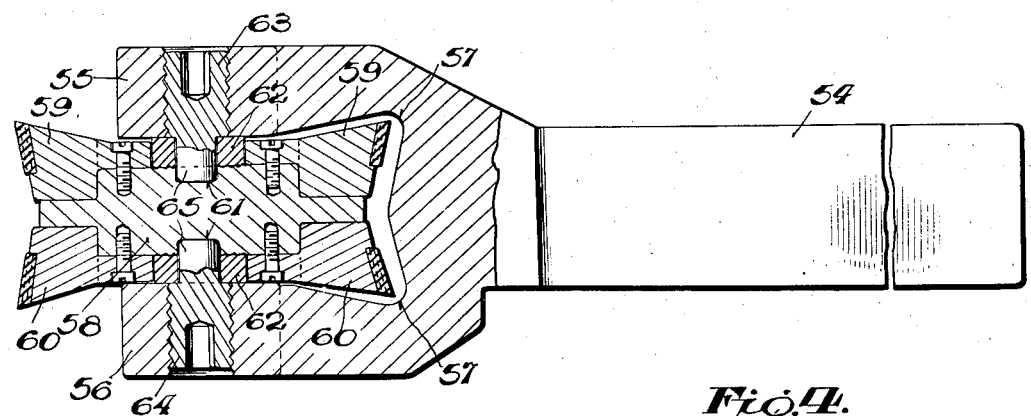
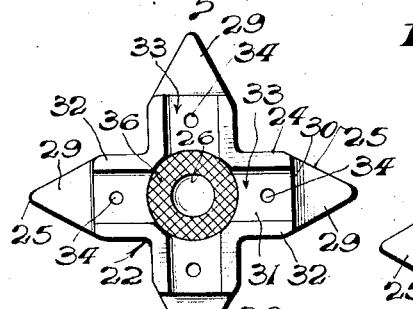
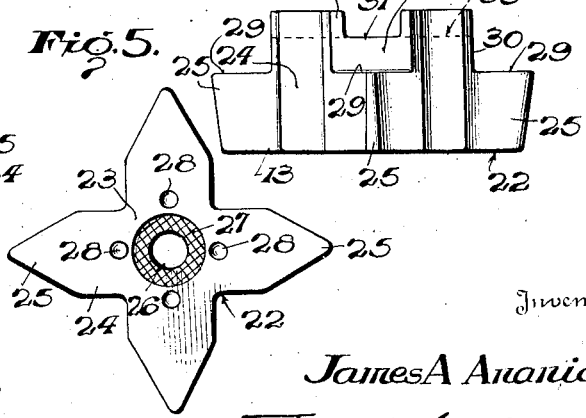
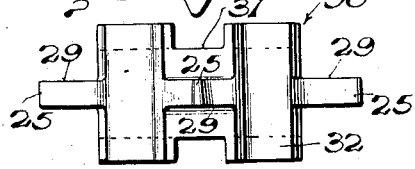

Patented Jan. 1, 1946

2,392,216

UNITED STATES PATENT OFFICE 2,392,216

CUTTER TOOL ASSEMBLY

James A. Anania, Newark, N. J.

Application October 11, 1943, Serial No. 505,859

9 Claims. (Cl. 29—102)

This invention relates to an improved cutter tool assembly.

In the operation of machine tools, a great difficulty and cause of slow-up in production resides in the fact that any single typical cutter is fashioned to perform a particular kind of work only so that, in order to finish a given product, it is often necessary to change tool holders whereby to select different cutters to suit variation in the character of the work to be done. Obviously, this results in delay and often, due to accuracy required in a new adjustment of a new or different tool, in spoilage of the product.

It is therefore an object of the present invention to provide a cutter tool assembly embodying a cutter head which may carry different cutters each adapted for a particular kind of work, and wherein each cutter may be brought into operative position without molesting the adjustment of the tool holder on the tool post.

A further object of the invention is to provide an assembly wherein the cutter head may be rotatably adjusted and locked firmly in adjusted position to selectively bring different cutters into position for work.

Still another object of the invention is to provide an assembly wherein, as a variation, the cutter head may be turned side for side as well as rotatably adjusted, to thus double the number of cutters which may be selectively used.

Another object of the invention is to provide an assembly wherein the cutter head may be of a relatively inexpensive metal, wherein the cutters themselves will be small in comparison with the size of the head and readily installed as inserts on the head or interchanged thereon, wherein the body of each cutter may also be of a relatively inexpensive metal, and wherein the actual, expensive, high-speed or hard metal cutting tip on each cutter will be small while, however, entirely sufficient for durability and prolonged use.

A further object of the invention is to provide an assembly wherein the cutters will be rigidly supported by the cutter head against the load of the cutting strain as well as against endwise thrust, and wherein the cutters will also be rigidly locked against sidewise canting or creeping.

Other and incidental objects of the invention will appear during the course of the following description, and in the drawings:

Figure 1 is a perspective view of my improved cutter tool assembly, the cutter head post being shown in dotted lines in elevated position.

Figure 2 is a fragmentary vertical section on the line 2—2 of Figure 1.

Figure 3 is a detail top plan view of the cutter head with the cutters removed.

Figure 4 is a detail side elevation of the cutter head with the cutters removed.

Figure 5 is a detail bottom plan view of the cutter head with the cutters removed.

Figure 6 is a detail perspective view showing different cutters which may be selectively used on the head.

Figure 7 is a fragmentary vertical section showing a variation of the invention wherein the cutter head is reversible end for end as well as rotatably adjustable.

Figure 8 is a detail side elevation of the cutter head seen in Figure 7, the cutters being removed.

Figure 9 is a top plan view showing a variation in the tool holder.

Figure 10 is a perspective view showing another variation in the tool holder.

Referring now more particularly to Figures 1 to 6 of the drawings, I employ a tool holder embodying a shank 10 rectangular in cross section to be accommodated by the usual tool post, as indicated in dotted lines in Figure 1 of the drawings, the shank being adjustable longitudinally in the usual manner on the post. At its forward end, the shank is provided with a fork 11 comprising an upper arm 12 and a lower arm 13, the inner face of the upper arm being cut away rearwardly toward the crotch between the arms to meet the rearwardly inclined wall of said crotch and provide a rounded clearance angle 14 between said wall and the inner face of the arm 12. The inner face of the arm 13 is flat.

At their forward ends, the arms 12 and 13 are provided with more or less circular terminals 15 and 16 respectively, having flat parallel inner faces but which are cut away, however, at their forward ends to provide flat clearance faces 17, and formed in the terminal 15 axially thereof is a cylindrical, smooth bore which serves as a socket 18. Formed in the terminal 16 axially of said socket is a threaded opening 19, and adjustable through said terminal rearwardly of said opening is a vertical locking screw 20 which preferably carries a lock nut 21 accommodated in a suitable recess in the lower face of said terminal.

Snugly but rotatably and removably fitting between the flat inner faces of the terminals 15 and 16 of the fork of the tool holder is a cutter head, indicated as a whole at 22. As seen in Figure 3 of the drawings, this cutter head is fashioned more or less in the shape of a four-point star, as viewed in top plan, and comprises a body 23 from which project quadrantly spaced cutter rests 24 rectangular in cross section at their base ends but tapered toward their free ends to provide V-shaped tips 25 each having a downwardly inclined forward edge. The lower face of the head 22 is flat to seat flat against the flat innner faces of the arm 13 and terminal 16 of the fork 11, and formed through said head axially thereof is a smooth bore 26 at the lower end of which is a circular, concentric recess 27 having a flat, knurled bottom wall. Formed in the lower sides of the rests 24, as seen in Figure 5, are sockets 28 to selectively receive the tip of the locking screw 20.

Formed in the cutter rests 24 at their upper sides are stepped cutter seats each of which comprises a flat horizontal face 29 at the upper surface of the adjacent supporting tip 25 for sustaining the cutting load, a vertical square shoulder 30 at the base end of said face for sustaining end thrust, and an elevated horizontal face 31 flanked by parallel, vertical flanges 32 which, together, provide a square socket 33 in which a cutter is anchored. As will be observed, the several pairs of flanges 32 are merged at their inner ends to form the angles between the rests 24 at the upper side of the cutter head, and formed in the sockets 33, medially thereof, are threaded openings 34. Snugly seated between the inner angles of the conjoined flanges 32 to surround the bore 26 is a washer 35 the lower face of which is knurled to engage a knurled face 36 on the body 23 of the cutter head, and seated in the recess 27 is a like washer 37 having a knurled upper face to coact with the knurled bottom wall of said recess.

Detachably mounted in the seats of the cutter head 22 is a plurality of cutters and, in this connection, it should be noted that the present assembly is equally adaptable for use on lathes, shapers and planers as well as boring mills for general use. To this end, a number of different cutters may be provided and in Figure 6, I have shown four specimen cutters numbered respectively, from left to right, 38, 39, 40 and 41. The cutter 38 is fashioned for general contour work, the cutter 39 for slotting and squaring, the cutter 40 for threading, and the cutter 41 for roughing and facing.

As will be observed, each of the cutters is provided with a body 42 having a flat bottom face 43 and a downwardly inclined front face 44. Extending rearwardly from the body is a rectangular tail lug 45 provided with an opening 46 and beneath said lug at the rear face of the body is a vertical shoulder 47. Brazed or otherwise fixed to the inclined front face 44 of the body at its upper end portion is a suitable thickness of hard cutting metal 48 which forms the actual cutting tip. Any suitable cutting metal may be employed. Thus, the body of the cutter may be of an inexpensive metal, as may also the cutter head 22, since the actual cutting face is localized at the tip of the cutter. A great saving in the cost of manufacture is thus effected, as prevalent, preferred cutting metals or alloys are extremely expensive.

As will be noted, the body of the cutter 38 is provided with a sloping upper surface and the cutting tip 48 thereof is rounded. In the cutter 39, the body thereof is provided with a reduced, raised portion 49 and the cutting tip 48 thereof is square. In the cutter 40, the top of the body is more or less flat and the cutting tip 48 is V-shaped, while in the cutter 41, the body thereof is angled to the right, as seen in Figure 6, and the cutting tip 48 thereof is flat at one side and rounded at the other, the upper face of the body being inclined.

In Figures 1 and 2 of the drawings, I have shown four of the cutters 38 mounted upon the cutter head 22. However, as will be appreciated, any single cutter head may carry one each of the cutters 38, 39, 40 and 41 or any desired combination of the four cutters. At will be observed, the flat bottom faces 43 of the bodies of the cutters 38 seat flat against the faces 29 of the cutter seats of the head so that the cutters will be rigidly sustained against the cutting load, while the shoulders 47 of the cutters abut flat against the vertical shoulders 30 for sustaining the cutters against end thrust. Furthermore, the tail lugs 45 of the cutters snugly fit between the pairs of flanges 32 to rest flat against the bottom walls of the sockets 33. The lugs will thus coact with said flanges for locking the cutters against canting, tilting or lateral creeping movement. Extending through the openings 46 of the tail lugs and engaged in the openings 34 of said sockets are cap screws 50 detachably securing the cutters in position. Thus, when any cutter becomes worn, it may be readily removed and another cutter substituted therefor.

Rotatably mounting the cutter head 22 is a cutter head post 51 provided at its upper end with a cylindrical head 52 having an axial socket to removably receive a wrench, as conventionally shown in dotted lines in Figure 2, and formed on the post at its lower end is a threaded terminal 53. As will be noted, the post extends snugly through the bore 26 of the head, through the washers 35 and 37 and is screwed into the opening 19 of the terminal 16 of the tool holder while the head 52 of said post is snugly received within the socket 18. A close fit is provided between the head and socket so that the post will be rigidly supported at its upper end to sustain the cutter head 22 against canting stress thereon. When the post is tightened downwardly, the cutter head will, as will be perceived, be tightly clamped in set position and, as brought out in Figure 2, the screw 20 may then be adjusted to engage in one of the sockets 28 for locking the cutter head against rotation.

In connection with the locking of the cutter head 22, it is to be noted that when the post 51 is adjusted tight, the washer 35 will be clamped between the head 52 of the post and the knurled face 26 of the cutter head. Likewise, the washer 37 will be clamped between the inner face of the terminal 16 of the tool holder and the knurled bottom wall of the recess 27. Thus, these washers will be caused to coact with the cutter head to provide a primary lock for the head securing the head against rotation while the screw 20 will provide a secondary lock therefor. As will be appreciated, it is imperative to positively secure the head against any rotation whatever as, otherwise, the cutter will be allowed to shift when in operation and the work will be spoiled.

The washers 35 and 37 have a further function. These washers are preferably of hard metal, whereas, as previously noted, the cutter head 22 may be of a softer, cheaper metal. Accordingly, when the post 51 is tightened, the washers will sustain and distribute the clamping pressure of the post and prevent distortion of the bore 26 of the head such as would otherwise ensue from repeated adjustments of the post.

As will now be seen, the rounded angle 14 of the tool holder is provided to afford clearance for the cutters 38 of the cutter head 22 and by rotatably adjusting the cutter head, the cutters may be selectively disposed in working position without changing the adjustment of the tool holder. Although, in the drawings, I have shown the cutter head completely equipped with the single cutter 38, it is again emphasized that said head may be equipped with different cutters particularly fashioned for different work, so that by merely rotating the cutter head to bring successive cutters selectively into working position, a given piece of work may be completed without changing the adjustment of the tool holder. A speed-up in production may thus be realized.

In Figures 7 and 8 of the drawings, I have shown a variation of the invention. The shank of the tool holder is indicated at 54, the terminals of the arms of the fork at 55 and 56, and the clearance angles at 57. The cutter head is indicated at 58. This cutter head is identical with the cutter head 22 except that the cutter head 58 is provided with cutter seats at both sides thereof and carries a series of four cutters 59 at one side thereof and a like series of four cutters 60 at the opposite side thereof. The cutters 59 and 60 are mounted identically with the other cutters previously described and are seen, in Figure 7, to be the same as the cutters 38. However, it is to be understood, as before, that any combination of different cutters desired may be employed.

Axially, the head 58 is provided with aligned sockets 61 surrounding which are washers 62 corresponding to the washers 35 and 37, and screwed through the terminal 55 is a cutter head post 63 while an identical post 64 is screwed through the terminal 56. At their inner ends, these posts are provided with smooth, reduced studs 65 which extend through the washers 62 and engage in the sockets 61. Thus, the cutter head 58 is mounted between the posts 63 and 64 and is locked against rotation thereby, the locking screw 20 being eliminated.

Normally, the cutter head 58 seats against the arm 56 and, as will be observed, some clearance is provided between the head and the arm 55. Accordingly, as the cutting tips of the cutters 59 and 60, as the case may be, are worn away, the post 63 may be backed away and the post 64 adjusted for elevating the cutter head until the tips of the cutters are again on center. Furthermore, as will be perceived, the cutter head 58 may be rotatably adjusted to dispose any desired cutter 59 in working position or may be turned side for side and rotatably adjusted to dispose any desired cutter 60 in working position.

In Figure 9 of the drawings, I have shown a slight variation in the tool holder. This holder is provided with a shank 66 like the shank 10, and a fork 67 like the fork 11. However, the fork is disposed at an angle to the shank, as indicated at 68, so that the shank may be reversed edge for edge in the tool post to extend at different angles therefrom. Mounted in the fork 67 is a cutter head assembly indicated as a whole at 69, this assembly being identical with the head 22 and associated parts.

In Figure 10 of the drawings, I have shown a further modification in the tool holder. In this embodiment, the holder is provided with a shank 70 rectangular in cross section, and formed on the forward end thereof is a hinge disk 71. The fork is indicated at 72 and is shown identical with the fork 11, except that the fork 72 is provided with a hinge disk 73 mating with the disk 71. Extending through said disks in the plane of the fork 72 is a pivot bolt 74. Thus, the fork may be adjusted to different angles with respect to the shank 70.

Having thus described my invention, what I claim is:

1. A cutter tool assembly including a tool holder, a cutter head carried thereby and provided with a plurality of spaced radial cutter rests having cutter seats each provided with stepped portions, insertable cutters anchored in said seats and each having stepped portions fitting the stepped portions of the seat, and means mounting the head for rotative adjustment to selectively dispose said cutters in working position.

2. A cutter tool assembly including a tool holder having a shank terminating in a fork having spaced arms, a rotatably adjustable cutter head mounted between the arms and provided with a bore therethrough, protective friction washers at the ends of said bore, a plurality of insertable radial cutters carried by the head, and a post carried by the arms to extend through said bore and washers and being screwed at one end into one of the arms and provided at its opposite end with a head extending through the other of said arms to abut one of said washers, the post being adjustable for clamping the head between said washers and securing the head in adjusted position.

3. A cutter tool assembly including a tool holder having a shank terminating in a fork having spaced arms, one of said arms being provided with a threaded opening and the other with a smooth socket, a rotatable cutter head mounted between the arms and provided with a bore therethrough, protective friction washers at the ends of said bore, a plurality of insertable radial cutters carried by the head, the head being rotatively adjustable to selectively dispose said cutters in working position, and a post extending through said bore and said washers and screwed into said opening, said post being provided with a head snugly fitting in said socket and being adjustable for clamping the head between said washers and securing the head against rotation.

4. In a cutter tool assembly, a rotatively adjustable cutter head having a plurality of spaced radial cutter rests each provided with a horizontal face at the tip, a vertical shoulder at the base of said tip, and a horizontal face stepped above said first mentioned face rearwardly of said shoulder and flanked by lateral flanges to provide a socket, insertable cutters mounted in said rests and each provided with a body having a flat bottom face to seat against said first named horizontal face, a vertical shoulder to abut said first named shoulder, and a tail lug to fit in said socket to coact with said flanges for locking the cutter against lateral displacement, and means engaged through said tail lugs removably securing the cutters in position.

5. A cutter tool assembly including a tool holder, a cutter head carried thereby, a group of insertable radial cutters carried by the head at one side thereof and presented for work at said side of the head, a group of insertable radial cutters carried by the head at the opposite side thereof and presented for work at the latter side of the head, whereby the head may be reversed side for side upon the holder to dispose either group of cutters in position for work, and means mounting the head for rotative adjustment to selectively dispose any one of said cutters in cutting position.

6. In a cutter tool assembly, a tool holder including a shank adjustably receivable in a tool post and provided with a hinge disk, a fork having a hinge disk mating with the former disk, and a pivot element extending through said disks in the plane of the fork and mounting the fork for angular movement with respect to the shank.

7. In a cutter tool assembly, a tool holder having a fork provided with spaced terminals, a rotatable cutter head disposed between said terminals, aligned posts extending through said terminals to engage the head at opposite sides thereof and rotatably seating the head between the inner ends of said posts, and cutters carried by the head, the head being rotatably adjustable to dispose any one of said cutters in cutting position.

8. In a cutter tool assembly, a cutter head having a cutter rest provided with stepped portions defining a shoulder having a seat face extending rearwardly therefrom and a second lower seat face extending forwardly from said shoulder to the free end of the rest, a cutter having stepped faces abutting said faces of the rest and a shoulder abutting said shoulder of the rest for sustaining rearward end thrust on the cutter, means on the head limiting the cutter against lateral movement, and means securing said cutter in position, the cutter being freely removable forwardly from the rest in contact with said faces thereof.

9. In a cutter tool assembly, a cutter head having a cutter rest provided with a stop shoulder having a seat face extending rearwardly therefrom and a second lower seat face extending forwardly from said shoulder to the free end of the rest, a cutter having a bottom face abutting the lower forwardly extending face of the rest and having a shoulder abutting the shoulder of the rest to sustain rearward end thrust on the cutter, the cutter being formed rearwardly of the shoulder thereof with a tail lug of less thickness than the forward portion of the cutter and abutting the rearwardly extending face of the rest, means on the head engaging said tail lug and limiting the cutter against lateral movement, and means extending through said tail lug and engaged with the head to secure the cutter in position, the cutter being freely removable forwardly from the rest in contact with said faces thereof.

JAMES A. ANANIA.